No. 776,018. PATENTED NOV. 29, 1904.
F. G. FRANKENBERG.
TOBACCO STRIPPING MACHINE.
APPLICATION FILED OCT. 24, 1902.
NO MODEL. 4 SHEETS—SHEET 1.
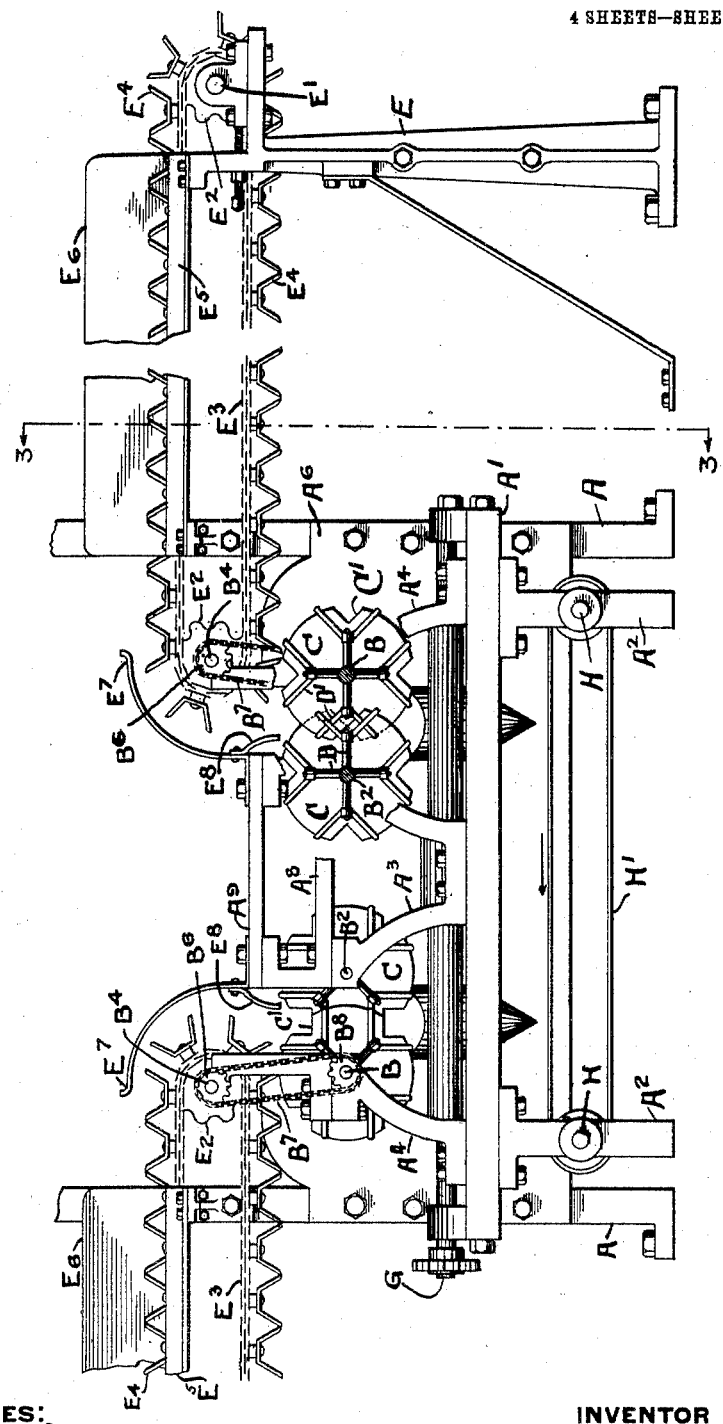
WITNESSES:
Frederic R. Murdock.
C. C. Steere.
INVENTOR
Frederick G. Frankenberg.
BY
Casper L. Redfield,
ATTORNEY.

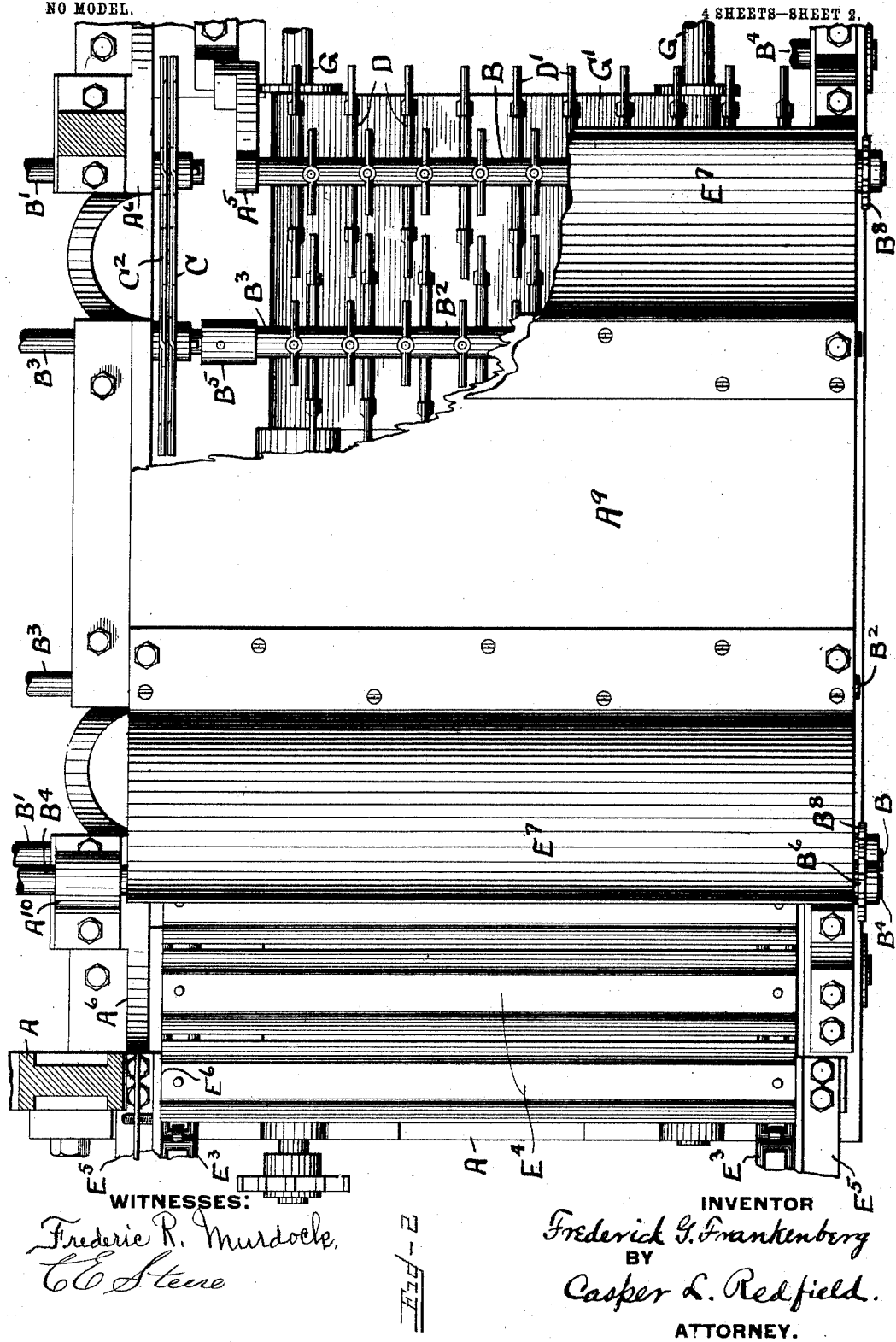

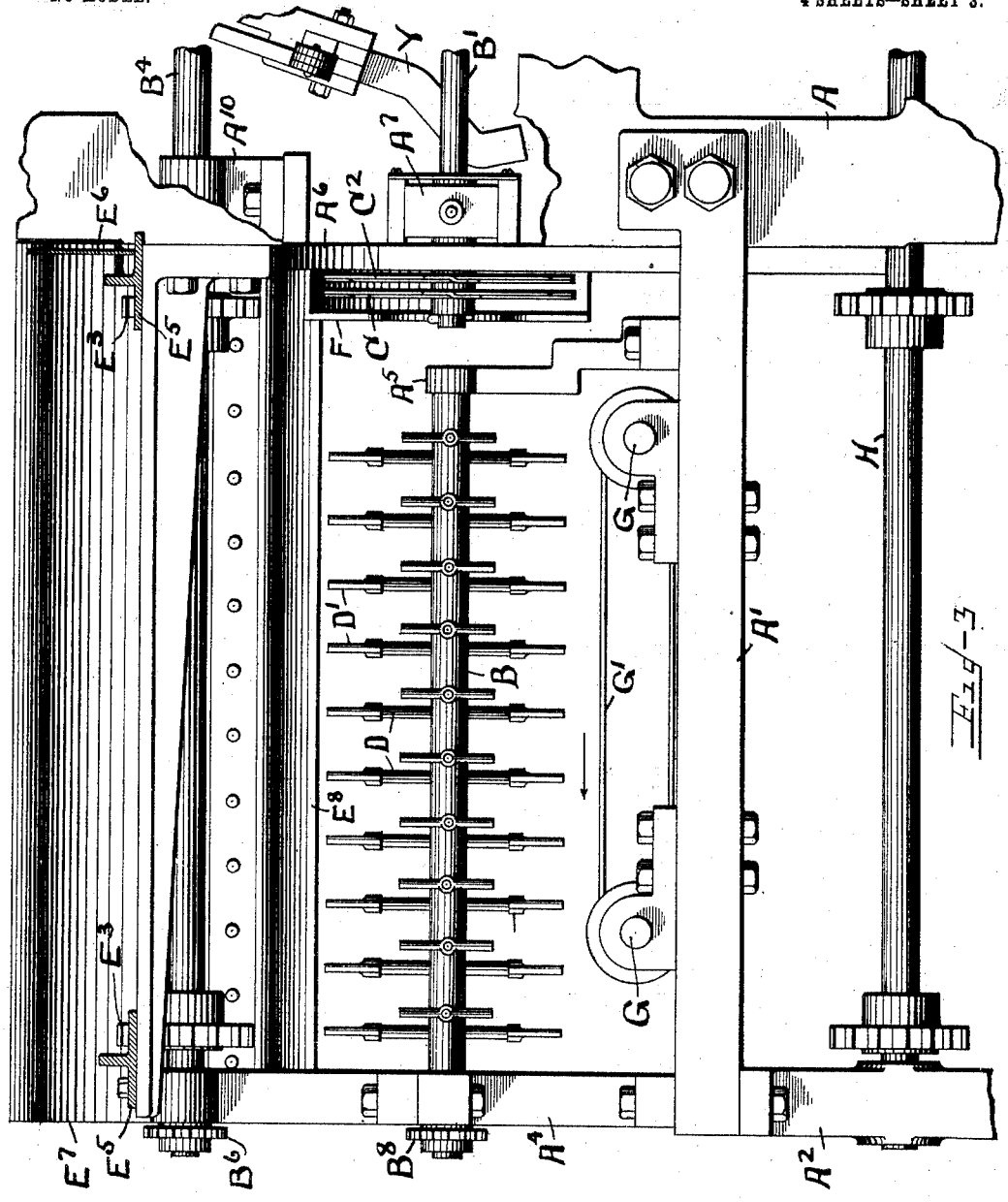

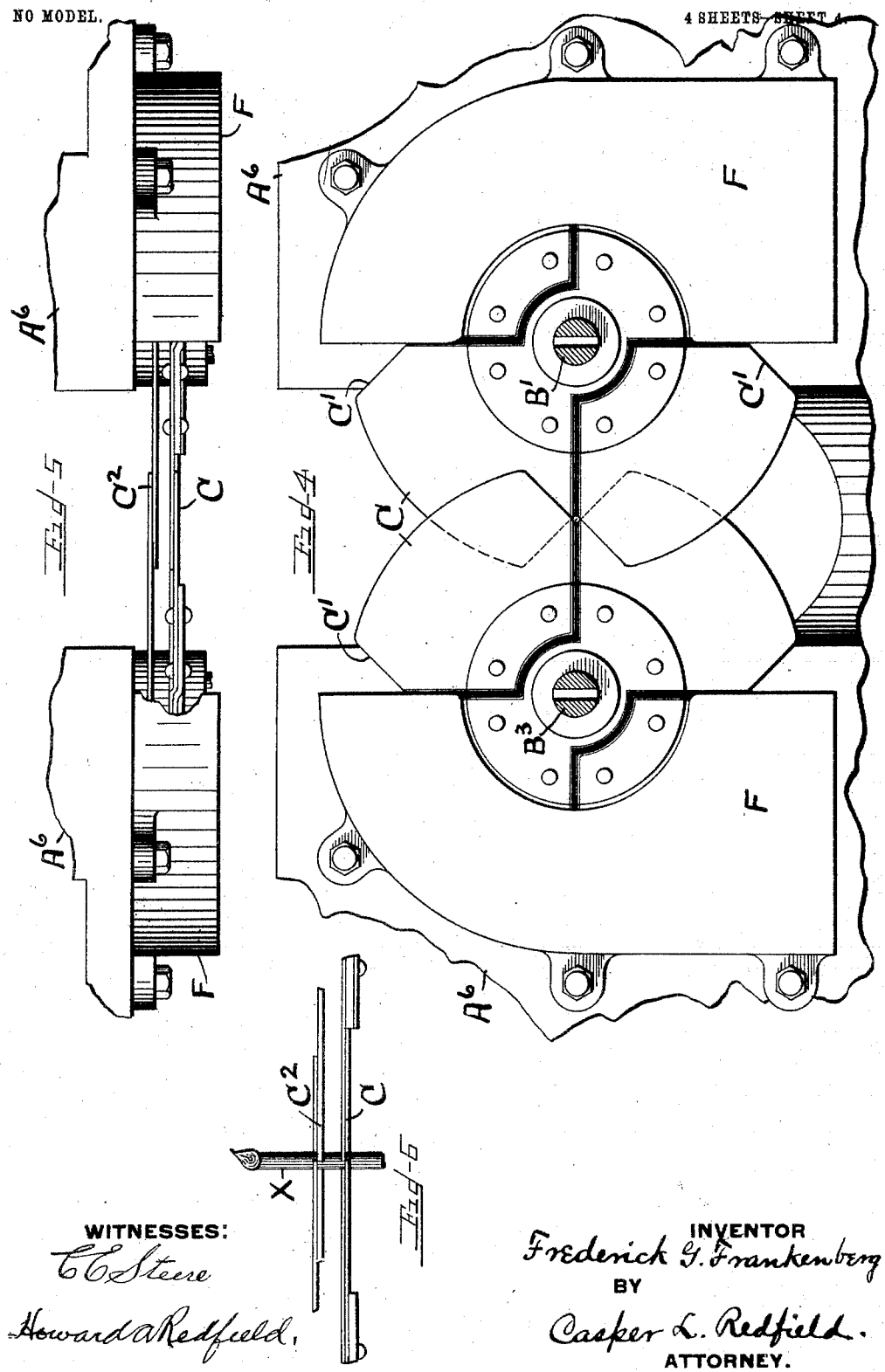

No. 776,018. Patented November 29, 1904.

UNITED STATES PATENT OFFICE.

FREDERICK G. FRANKENBERG, OF CHICAGO, ILLINOIS, ASSIGNOR TO LANDON-SHARP MACHINE CO., OF CHICAGO, ILLINOIS.

TOBACCO-STRIPPING MACHINE.

SPECIFICATION forming part of Letters Patent No. 776,018, dated November 29, 1904.

Application filed October 24, 1902. Serial No. 128,591. (No model.)

*To all whom it may concern:*

Be it known that I, FREDERICK G. FRANKENBERG, a citizen of the United States of America, and a resident of Chicago, county of Cook, and State of Illinois, have invented certain new and useful Improvements in Tobacco-Stripping Machines, of which the following is a specification.

My invention relates to tobacco-stripping machines, and has for its object improvements in the stripping devices and in the devices for feeding the leaves to the stripping devices.

In machines of the kind to which the present invention relates the stems of tobacco-leaves are placed between blades that open and close, and when the blades have closed upon a stem a movable gripping device seizes the stem and draws it through the blades, leaving the stripped leaf on one side of the blades and discharging the stem upon the other. In the present case the blades are rotating disks provided with notches in their peripheries. Two of these disks constitute a pair of blades which overlap each other and are rotated so that the notches in one blade will register with the notches in the other blade. The stems of tobacco-leaves are embraced by corresponding notches in opposite blades, and it is the office of the feeding devices to automatically present the leaves to the rotating blades at the proper instant of time. The gripping device vibrates to and from the stripping device; but as the mechanism for causing each vibration is no part of the present invention it is not shown in the drawings. Otherwise the drawings show the feeding mechanism attached to the front portion of the frame of the machine, which frame is broken away.

In the said drawings, Figure 1 is a front elevation, parts being broken away, so as to more clearly show the mechanism. Fig. 2 is an enlarged plan of Fig. 1, the conveying devices being removed at one side and part of the upper portions being broken away to show the mechanism beneath. Fig. 3 is a section on line 3 3 of Fig. 1, drawn to the scale of Fig. 2 and having the conveyer removed. Fig. 4 is an enlarged front elevation of a pair of blades and removable shields placed over them, which shields are omitted in Figs. 1 and 2 and partially omitted in Fig. 3. Fig. 5 is a plan of Fig. 4, showing the blades, the auxiliary blades located behind the main blades, and the shields over the blades; and Fig. 6 is a detail section of the blades adjacent to the center line and showing a stem held in position.

Secured to the posts A of the machine is a frame $A'$, the front end of which is supported by legs $A^2$. Mounted on the front end of the frame $A'$ are the standards $A^3$ and $A^4$, and on the rear end of the same frame are the standards $A^5$. Also secured to the posts A and extending across the front of the machine, so as to form a sort of a partition between the machine and the feeding mechanism, is a plate or board $A^6$. Supported in the brackets $A^4$ and $A^5$ are the shafts B, which are in line with shafts $B'$, which have their front ends supported in sliding boxes $A^7$ on the plate $A^6$ and their rear ends supported within the machine. The shafts $B^2$ have their front ends supported in the bracket $A^8$ and their rear ends coupled to the shafts $B^3$, which also extend into the machine and are partly supported by the plate $A^6$. On the top of the bracket $A^3$ is another bracket $A^8$, (shown partly broken away in Fig. 1,) and supported on the bracket $A^8$ and on the plate $A^6$ is a board $A^9$, forming a table over the center of the feeding mechanism. Located on the upper edge of the plate $A^6$ are the boxes $A^{10}$, and supported in the brackets $A^4$ and boxes $A^{10}$ are the shafts $B^4$. The shafts $B'$, $B^3$, and $B^4$ are driven from some point within the machine, and by virtue of the coupling $B^5$ between the shafts $B^2$ and $B^3$ the said shafts $B^2$ are also driven. On the front ends of the shafts $B^4$ are sprocket-wheels $B^6$, which connect by chains $B^7$ with sprocket-wheels $B^8$ on the shafts B. These connections are so arranged that the shafts B, $B'$, $B^2$, and $B^3$ will have a uniform speed.

Secured on the shafts $B'$ and $B^3$ are the leaf-stripping blades C, having notches $C'$. These blades have portions of their bodies offset in opposite directions in lines from their centers to the notches in their peripheries, so that when they are rotated to make their notches register they overlap each other, crossing at the apex of their notches. Also secured to the shafts B' and B³ and closely adjacent to the rear faces of the blades C are other blades C², provided with similar notches. The blades C² may or may not be offset like the blades C. They are shown as plain flat disks which overlap each other by one being placed in front of the other. The notches in the blades C² are located in line with the notches in the blades C, and when a stem is embraced by the blades C it is also embraced by the blades C². The result of this is that the stem is held in a definite position, as shown at X in Fig. 6, thus positively avoiding the stem being pushed to one side out of reach of the gripping device. (Shown at Y in Fig. 3.)

Secured to the shafts B and B² are a series of arms D, having forks D' at their outer ends. These forks correspond in location to the notches C' in the disks C; but the crotches of the forks are of slightly less radius than the notches in the disks, and their office is to loosely embrace the leaves and hold them in line with the notches C' while being stripped. These forks, in effect, form a channel for guiding the body of the leaf while being stripped by the stripping devices.

Located at the sides of the devices described are standards E, which support shafts E' parallel to the shafts B⁴. On the shafts E' and B⁴ are sprocket-wheels E², which carry chains E³, which run on guides E⁵. Secured to the links of the chains E³ are troughs E⁴, and adjacent to the rear ends of these troughs is a board E⁶. The leaves are placed by hand in the troughs E⁴, with their stems against the board E⁶, and the shafts B⁴ are timed so that the leaves will be dropped at the proper instant between the forks D' and with their stems between the notches C' of a pair of disks C. The position of these parts at the time a leaf is dropped is substantially that shown at the left hand of Fig. 1. Secured on the edges of the board or table A⁹ are guards E⁷, which extend in the arc of a circle over the troughs E⁴ while they are turning over the sprocket-wheel E² and serve to hold the leaves from displacement during the turning action. Fastened to the lower edges of the guards E⁷ are metal strips E⁸, which serve both for guiding the leaves while dropping and also for preventing them from dropping too soon.

When the disks C and the forks D' are in the position shown in the right-hand portion of Fig. 1, the gripping devices are rapidly drawing a stem through the opening formed by the notches C'. In this action the stripped leaf piles up against the front faces of the disks C and sometimes sticks there. To free any leaves that may stick to the disks C, there is placed over them the shields F. (Shown in Figs. 3, 4, and 5.) These shields may be of any convenient shape and are secured to the plate A⁶. Their office is to knock or scrape off any leaves that may chance to stick to the disks as they rotate.

On the frame A' are supported the shafts G, upon which are belts G' underneath the shafts B and B². The object of these belts is to discharge at the front of the machine any leaves that may be passed down through the forks D' without being gripped by the gripping device Y and stripped through the stripping devices C C'. Supported in the legs A² and in the machine back of the dividing-plate A⁶ are the shafts H, on which is a conveying-belt H'. The object of this belt is to discharge to one side all stripped leaves.

The conveyers G' and H', the gripping device Y, and all those parts of the machine back of the dividing-plate A⁶ are substantially the same as those shown in my Patent No. 715,652, issued December 9, 1902, and are not a part of the present application.

What I claim is—

1. The combination with a leaf-stripping device, of a conveyer provided with a series of leaf-holding troughs, and means whereby upon moving said conveyer the leaves contained in said troughs will have their stems placed one by one in said stripping device.

2. In a tobacco-stripping machine, the combination with a pair of leaf-stripping blades arranged to open and close, and means for drawing the stems of leaves through an aperture furnished by said blades when closed, of means for presenting the stems of leaves to said stripping-blades, and a channel arranged to loosely embrace and guide the body of a leaf while its stem is being drawn through the stripping-blades.

3. The combination with a leaf-stripping device, and means for drawing the stem of a leaf through said device, of a leaf-guiding channel arranged to loosely embrace the body of a leaf while being stripped, and means for moving said channel so as to definitely place the stem of its contained leaf within said stripping device.

4. In a tobacco-stripping machine, the combination with a pair of disks provided with notches for the stripping of tobacco-leaves, and means for rotating said disks, of a second pair of similarly shaped and moved disks arranged to guide the stems of leaves held by the first-mentioned disks.

5. In a tobacco-stripping machine, the combination with leaf-stripping devices arranged to open and close, and a leaf-guiding channel also arranged to open and close, of a conveyer upon which tobacco-leaves may be placed by hand, and means for moving said conveyer so as to cause it to deposit a leaf in said guiding-channel each time it opens.

6. In a tobacco-stripping machine, the combination with a pair of disks provided with notches for the stripping of tobacco-leaves, devices furnishing a channel for guiding the body of a leaf while being stripped, and means for rotating said disks and said devices so as to cause them to open and close at regular intervals of time, of a conveyer having partitions between which leaves may be placed by hand, and means for moving said conveyer so as to cause it to deposit a leaf in said stripping devices and said channel each time they open.

7. In a tobacco-stripping machine the combination with leaf-stripping and leaf-guiding devices, of a conveyer for delivering leaves to said devices, troughs on said conveyer for the reception of individual leaves, and a guard located adjacent to said conveyer and arranged to guide the delivery of leaves to said devices.

Signed at Chicago, Illinois, this 14th day of October, 1902.

FREDERICK G. FRANKENBERG.

Witnesses:
WM. A. ROWLAND,
C. L. REDFIELD.